(12) United States Patent
Dautrey

(10) Patent No.: US 9,180,740 B2
(45) Date of Patent: Nov. 10, 2015

(54) SOUND SUPRESSING DEVICE FOR A TIRE TREAD

(75) Inventor: Nicolas Dautrey, Chamalieres (FR)

(73) Assignees: COMPAGNIE GENERAL DES ETABLISSEMENTS MICHELIN, Clearmont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 1133 days.

(21) Appl. No.: 13/133,131

(22) PCT Filed: Dec. 2, 2009

(86) PCT No.: PCT/EP2009/066212
§ 371 (c)(1),
(2), (4) Date: Jul. 5, 2011

(87) PCT Pub. No.: WO2010/063749
PCT Pub. Date: Jun. 10, 2010

(65) Prior Publication Data
US 2011/0259493 A1    Oct. 27, 2011

(30) Foreign Application Priority Data
Dec. 5, 2008  (FR) ..................................... 08 58305

(51) Int. Cl.
*B60C 19/00* (2006.01)
*B60C 11/13* (2006.01)

(52) U.S. Cl.
CPC ................ *B60C 11/13* (2013.01); *B60C 19/00* (2013.01); *B60C 19/002* (2013.04); *B60C 11/1369* (2013.04); *B60C 2011/1361* (2013.04)

(58) Field of Classification Search
CPC  B60C 11/13; B60C 11/1338; B60C 11/1361; B60C 11/1369; B60C 19/002; B60C 19/00; B60C 2011/1338; B60C 2011/1361

USPC ................. 152/209.2, 209.3, 209.19, 209.21, 152/209.22, 209.18
See application file for complete search history.

(56) References Cited

U.S. PATENT DOCUMENTS 4,217,942 A    8/1980  Takigawa et al.
5,147,478 A    9/1992  Nock et al.

FOREIGN PATENT DOCUMENTS

DE    44 03 662 A1    8/1995
EP    0 391 600 A2    10/1990

(Continued)

OTHER PUBLICATIONS

Machine Translation of JP09-058217 (no date).*

(Continued)

*Primary Examiner* — Richard Crispino
*Assistant Examiner* — Philip N Schwartz
(74) *Attorney, Agent, or Firm* — Dickison Wright PLLC

(57) ABSTRACT

Tire having a tread comprising at least two grooves of generally circumferential orientation, a plurality of transverse grooves (6), each transverse groove culminating in openings into two circumferential grooves, the circumferential and transverse grooves having appropriate cross sections for allowing, when running, a flow of liquid present on the road surface, a plurality of closing devices located in these grooves, each closing device closing at least partly the cross section of a groove, each closing device delimiting, with one end of a transverse groove, a length of groove LR of between half and three-quarters of the length of circumferential groove in contact, the length measured under nominal conditions of load and pressure, this tire being characterized in that each closing device is designed to flex and open the section of groove in which it is placed, under the action of a flow of liquid so as to allow the said liquid to flow when running on a water-covered road surface.

8 Claims, 3 Drawing Sheets

(56) References Cited

FOREIGN PATENT DOCUMENTS

| | | |
|---|---|---|
| GB | 2 008 043 A | 5/1979 |
| JP | 5-155203 A | 6/1993 |
| JP | 9-058217 A | 3/1997 |

OTHER PUBLICATIONS

Search Report mailed Mar. 11, 2010 for International Application No. PCT/EP2009/066212.

* cited by examiner

SOUND SUPRESSING DEVICE FOR A TIRE TREAD

The field of the invention relates to tire treads and more particularly the sculptures of these treads.

To achieve indispensable road handling and grip performance, it is known practice to provide a tread for a tire with a plurality of grooves of generally circumferential (or longitudinal) orientation. A groove is delimited by facing walls apart from one another by a distance of at least more than 2 mm, these walls being able to be flat or corrugated or else in a zigzag. These side walls are joined by a bottom wall. When running, a groove is closed by contact with the road surface and two ends are formed allowing a fluid to flow inside the said groove.

It has been found that at certain running speeds, the air flow in the circumferential grooves could generate resonance noise that increases the perceived sound level. It is known practice to place in these grooves sorts of gates that reduce the length of the resonance tube in contact with the road surface. Although this device is effective, these elements may nevertheless disrupt the liquid flows in the groove notably when running on water-covered ground.

One object of the invention is to propose a tread sculpture for a tire which, while significantly reducing the noise associated with the resonances of the air columns in the circumferential grooves, does not disrupt the flow of liquid.

For this purpose, the tire according to the invention is provided with a tread comprising at least two grooves of generally circumferential orientation and a plurality of transverse grooves of generally transverse orientation, each transverse groove culminating in two openings in two circumferential grooves.

These circumferential and transverse grooves have appropriate transverse grooves to allow, when running, a flow of liquid present on the road surface. This tread comprises a plurality of closing devices located in these grooves, each closing device closing at least partly the cross section of a groove, each closing device being appropriate for flexing and opening the section of the groove in which it is placed only under the action of a flow of liquid when running on a water-covered road surface. Formed on the tread of this tire is a plurality of resonators for attenuating the noise generated in a circumferential groove. This tire is characterized in that each resonator is formed in at least one transverse groove and comprises an opening onto the said circumferential groove, this opening corresponding to one of the openings of the said transverse groove. Each resonator has a length LR of between half and three-quarters of the length of circumferential groove in contact, the length being measured under nominal load and pressure conditions. Moreover, each resonator has at least one other opening closed by one of the said closing devices.

By virtue of this tread and of the presence of closing devices capable of creating a length of groove that is open at only one end in a circumferential groove, it is possible to create a plurality of quarter-wave resonators or of Helmholtz resonators in order to attenuate the resonance noise of the air moving in the said circumferential groove. The length LR of the quarter-wave resonator is obtained by multiplying the length of the circumferential groove in contact by a coefficient at least equal to 0.5 and at most equal to 0.75. This tread retains all the performance of a tread without closing devices for closing the grooves when running on a water-covered road surface since the closing devices are suitable for flexing under the pressure of the water flowing in the grooves, this flexing making it possible to regain a large portion of the total section of the grooves.

In order to obtain satisfactory performance, it is recommended that each closing device occupies at least 50% of the cross section of the groove in which it is placed, and yet more preferably 70% of the said section.

In a preferred embodiment, at least one of the closing devices is placed in a transverse groove so as to delimit, in the said transverse groove, a length LR of groove with one of the ends of this groove in order to form a resonator entirely contained in the said transverse groove, this length LR being between half and three-quarters of the length of the circumferential groove in contact when the tire is inflated to its nominal inflation pressure and carrying its nominal load (these values being defined notably by the TRA or the ETRTO).

In another preferred embodiment, at least two closing devices are placed in one and the same circumferential groove, these two devices being situated circumferentially on either side of one end (opening) of a transverse groove, so as to delimit with the said transverse groove a length LR of groove between one of the closing devices and the other end (opening) of the said transverse groove in order to form a resonator.

Naturally, those skilled in the art can combine the two preferred embodiments specified in the above paragraphs by placing closing devices both in transverse grooves and in circumferential grooves.

Other features and advantages of the invention will emerge from the description made below with reference to the appended drawings which show, as non-limiting examples, embodiments of the subject of the invention.

To make the figures and the associated description easier to understand, the same reference numbers are used in the drawings to indicate structural or functional elements that are identical irrespective of the variant in question.

Figure 1A:
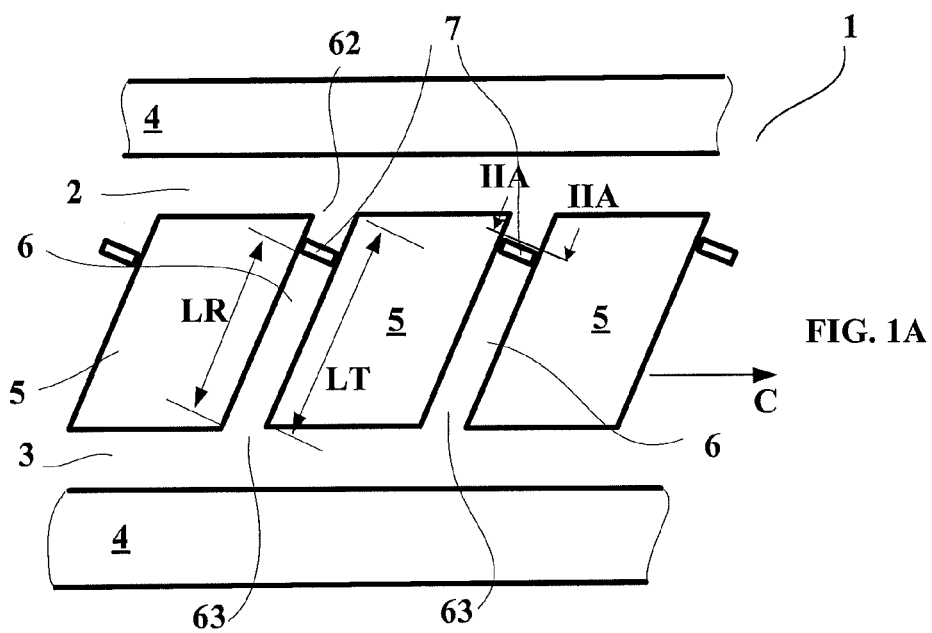
FIG. 1A shows a partial plan view of a first variant of a tread according to the invention.
Figure 1B:
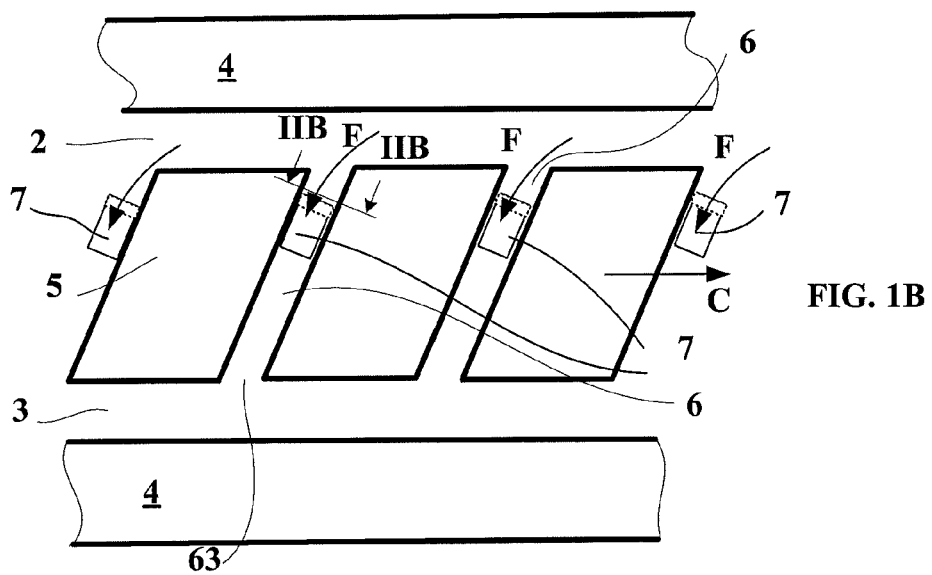
FIG. 1B shows a partial plan view of the same tread as that shown in FIG. 1A when running on a water-covered road surface.

FIGS. 1A and 1B show a view of the running surface of a portion of a first tread variant 1 according to the invention, designed to be fitted to a tire for a passenger vehicle. The dimensions of this tire are 255/40 R 19. These views show two circumferential grooves 2, 3 each delimited by a circumferentially continuous rib 4 and a row of blocks 5. The blocks 5 are separated circumferentially from one another by transverse grooves 6 that are oblique, that is to say forming a non-zero angle with the circumferential direction indicated by the direction C in the figures.

The circumferential grooves 2, 3 have an average width of 10 mm and a depth of 8 mm. The transverse grooves 6 an average width of 3 mm and a depth of 7 mm.

Each transverse groove 5 leads into the two circumferential grooves 2, 3 via two ends (or openings) respectively 62, 63.

In each transverse groove 6 there can be discerned a strip 7 playing the role of a closing device placed quite close to the end 62 of the said transverse groove opening into the longitudinal groove 2, the function of this device being to delimit a length LR of groove up to the other end 63 of the same transverse groove. The transverse grooves 6 therefore have a length LT that is greater than the length LR. In the present case, the length LT is equal to 80 mm and the length LR is equal to 70 mm.

In the nominal conditions of use, namely an inflation pressure of 2.5 bars and a supported load of 670 daN, the average length of circumferential groove is 120 mm.

Figures 2A, 2B:
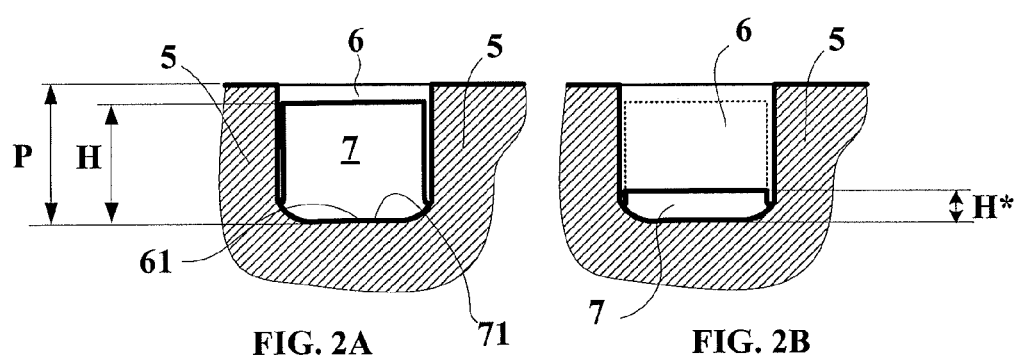
FIG. 2A shows a partial view in section along the line II-II taken from FIG. 1A.
FIG. 2B shows a partial view in section along the line II-II taken from FIG. 1B.

FIG. 1A shows the closing devices in a raised position preventing the air circulation in the transverse grooves 6: this closing device can be seen in FIG. 2A which shows in section, along the line IIA-IIA the transverse groove 6 in the vicinity of this device. This FIG. 2A shows that this closing device is formed by a strip 7 of flexible rubbery material linked by its base 71 to the bottom of the transverse groove 61 and extending over a height H equal in the present case to 90% of the depth P of the transverse groove. Moreover, this strip 7 occupies substantially the whole width of the transverse groove 6, give or take a clearance allowing this strip 7 to flex in the transverse groove as shown in FIG. 2B. In this instance, a strip 7 occupies almost 80% of the cross section of the groove 6.

In a configuration of rolling on dry ground, only an air flow under low pressure exists inside the longitudinal grooves and this low pressure is not sufficient to cause the strips to flex. Therefore it is possible to create a cavity having an appropriate length to serve as a resonator in order to attenuate the resonance noise of the air flowing in the said circumferential groove. The length LR of this resonator is determined as a function of the length in contact of the longitudinal groove into which this resonator opens.

FIG. 1B shows the same portion of tread when running on water-covered ground: in this configuration, the water pressure is sufficient to make the strips 7 flex in the transverse grooves. The arrows F indicate the flow of water that can pass into the transverse grooves 6.

FIG. 2B shows a section along the line IIB-IIB of the same transverse groove 6 when the tire is running on water-covered ground (this representation corresponds to the passage in contact with the ground). In this configuration, the pressure exerted by the water that flows in the longitudinal grooves 2, 3 and that reaches the transverse grooves 6 is sufficient to make the flexible strips 7 flex. The effective section of groove to allow the flow of the water increases very substantially in this configuration (shown in dotted lines is the strip in its inflexed position). Therefore, since the water can flow in all the grooves including the transverse grooves, it is possible to maintain running performance on water-covered ground at a satisfactory level for the user. By virtue of the elasticity and of the flexibility of the strip and of the material of which it is made, when the pressure is below a given limit (corresponding to the return to running on dry ground), the closing devices resume their initial position and close the transverse grooves.

Each strip 7 of material is molded with the tire and has a thickness that is appropriate to flex under the action of the water flow when running on a water-covered road surface. Moreover, these strips 7 are attached by their base 71 to the bottom 61 of the transverse grooves 6 and extend outwards closely following the walls of the blocks in order to close the transverse groove as much as possible. For a tire intended for a passenger vehicle, the thickness of each strip is between 0.1 mm and 2.0 mm, limits included. Preferably, the percentage of closure of a groove by each strip is at least 50% of the sectional area of the groove and yet more preferably at least 70%.

Figure 3:
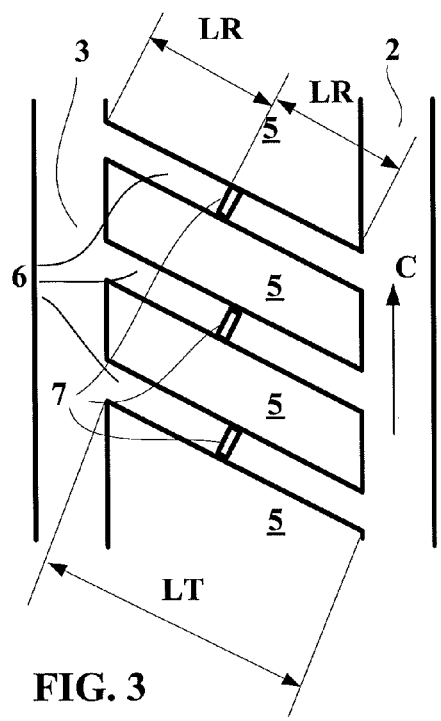
FIG. 3 shows a second variant of a tread according to the invention.

FIG. 3 shows a second variant of a tread according to the invention in which the strips 7 forming closing devices are placed substantially in the middle of the transverse grooves 6 that are oblique and form an angle of 45° with the circumferential direction C, each strip 7 delimiting a length LR of groove with each end 62, 63 of the transverse groove in which it is placed. The transverse grooves 6 therefore have a length LT equal to twice LR. As in the previous example (and for all the other examples given here) the length LR is determined as a function of the length of the circumferential groove in the region of contact with the ground in order to obtain a resonator effect for this circumferential groove.

The resonators thus created are active for the two circumferential grooves on either side of the blocks.

Figure 4:
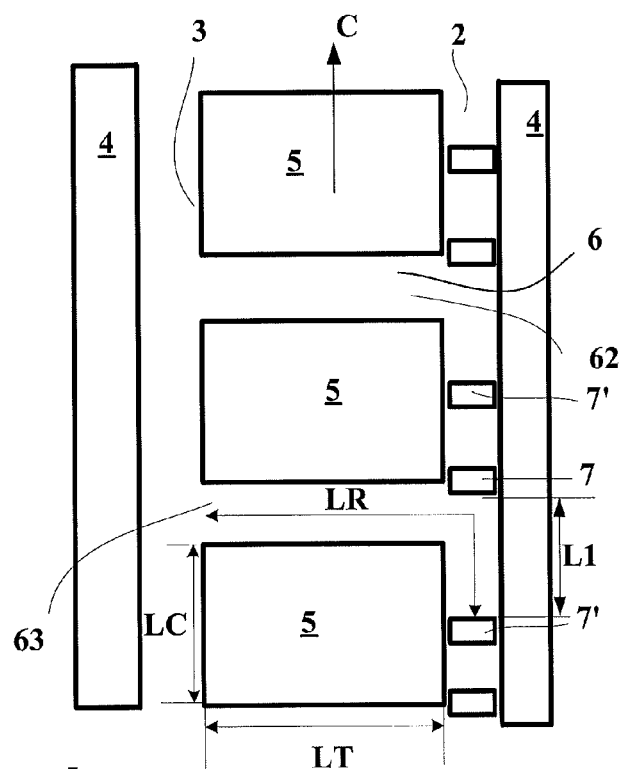
FIG. 4 shows a third variant of a tread according to the invention.

FIG. 4 shows a third variant of the invention. In this variant, a row of blocks 5 separated from one another in the circumferential direction C by transverse grooves 6 is bordered axially on either side by a first circumferential groove 2 and a second circumferential groove 3.

According to this variant, each closing device to form a resonator consists of a first strip 7 and of a second strip 7', these two strips being placed in one and the same circumferential groove 2. In this case, the first strip 7 is placed close to one of the ends 62 of a transverse groove 6, this first strip not obstructing the said transverse groove and the second strip 7' in the same circumferential groove 2 at a distance L1 from the first strip 7, this distance L1 being determined so that the total of the lengths L1 and of the length LT of the transverse groove 6 is equal to the appropriate length LR of the resonator being used to attenuate the resonance noise of the second circumferential groove 3 placed axially on the other side from the row of blocks 5. Naturally, in this variant, the circumferential dimension of the blocks 5 must be appropriate to create a sufficient space between the two strips 7, 7' in order to allow these strips to flex when running on water-covered ground.

Figure 5:
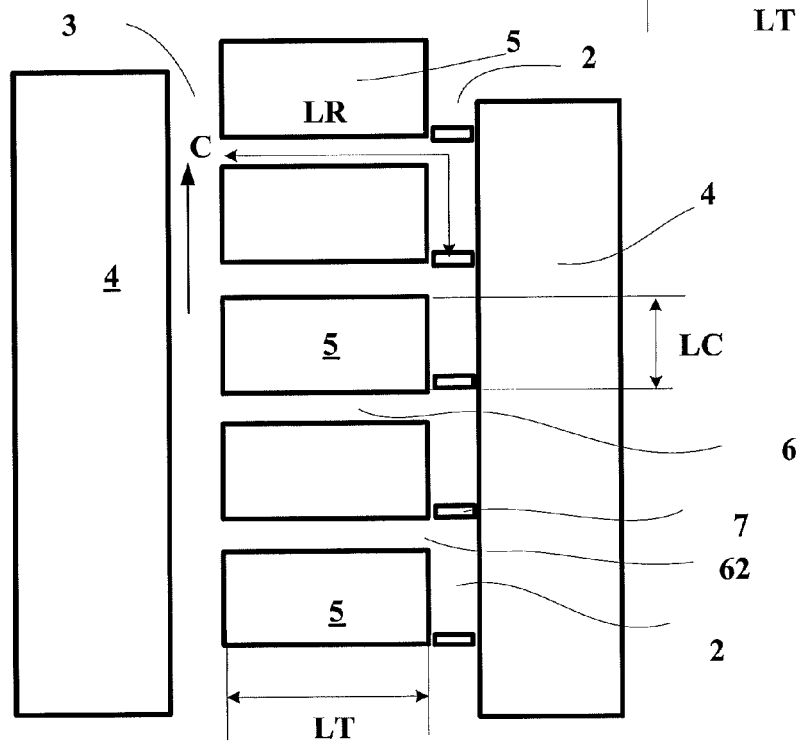
FIG. 5 shows a fourth variant of a tread according to the invention.

The fourth variant shown in FIG. 5 is substantially equivalent to the third variant of FIG. 4: the difference lies in the fact that the circumferential length LC of the blocks 5 is such that the total of the transverse dimension LT and the circumferential dimension LC of a block is equal to the length LR of the resonator for a circumferential groove. In this fourth variant, each strip 7 is placed in the groove 2 so as to be in line with a wall limiting a transverse groove. One and the same strip 7 contributes to the formation of two resonators.

Figure 6:
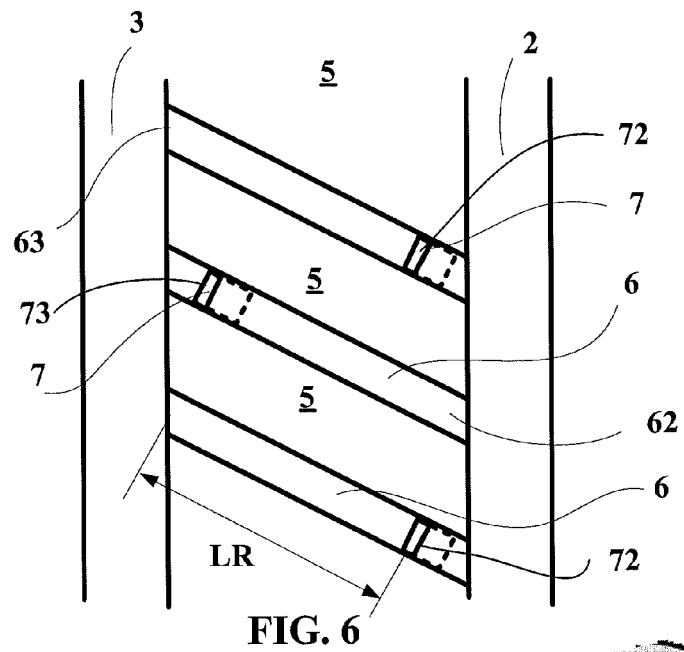
FIG. 6 shows a fifth variant of a tread according to the invention.

FIG. 6 shows a fifth variant of the invention according to which, in order to attenuate the resonance noise of two circumferential grooves 2, 3 situated on either side of a row of blocks 5 separated from one another by transverse grooves 6, strips 7 are placed in the transverse grooves 6 so that the said strips 7 are effective for one circumferential groove or for another. One strip 72 is placed in a transverse groove 6 close to one end 62 of the said groove 6 opening into the circumferential groove 2; one strip 73 is placed close to another end 63 opening into the circumferential groove 3. The strip 72 placed close to the end 62 delimits a length LR of resonator attenuating the resonance noise in the circumferential groove 3. The strip 73 placed close to the end 63 delimits a length LR of resonator attenuating the resonance noise in the circumferential groove 2. In this FIG. 6, the strips 72 and 73 are shown in solid lines in the closed configuration of the grooves and in dotted lines in the open configuration of the grooves under the action of the flow of water when running on water-covered ground.

Figure 8:
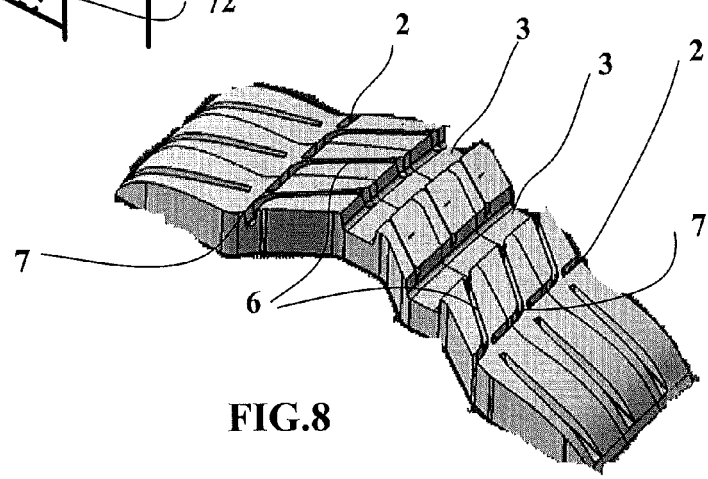
FIG. 8 shows the drawing of the tread of the tire according to the invention for which the noise signals have been computed and shown in FIG. 7.
Figure 7:
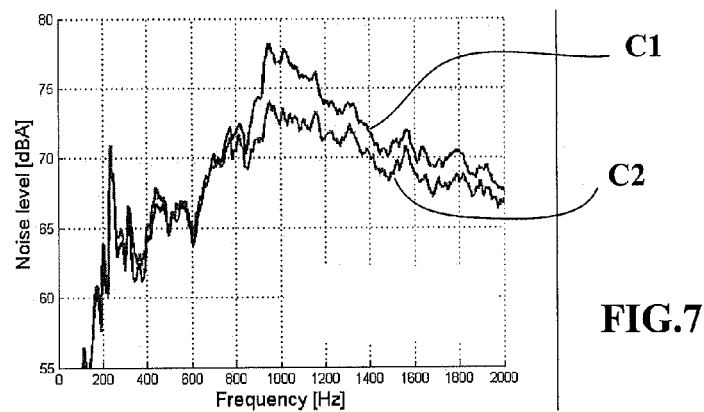
FIG. 7 shows a comparison of the noise signals computed for a tire of reference and a tire according to the invention.

FIG. 7 represents a comparison of the noise emitted by a tire of reference and a tire according to the invention having the same design of tread as the tire of reference and provided with a plurality of devices for attenuating resonance noise in the circumferential grooves in which the sculpture design is shown by FIG. 8. This FIG. 8 shows that the tread is provided with two circumferential grooves 3 in the middle portion and one circumferential groove 2 between each groove 3 of the middle portion and the outermost portion of the tread. Each pair of circumferential grooves delimits a row which itself is provided with oblique grooves 6. The circumferential grooves 2 are provided with strips 7 playing the role of closing device for the circumferential grooves 2 and forming with each oblique groove a resonator to attenuate the noise when running on dry road surface (the positioning of the strips 7 is similar to that shown with the variant of FIG. 5). An overall emitted noise reduction of the order of 2.3 dBA is found between the tire according to the invention (100.3 dBA) and the tire of reference (102.6 dBA). In FIG. 7 showing the emitted noise recordings (the x axis shows the frequency in Hz and the y axis the noise level in dBA) a substantial attenuation is noted between the tire of reference (curve C1) and the tire according to the invention (curve C2) in the levels for frequencies higher than 800 Hz.

The invention is not limited to the examples described and represented and various modifications can be made thereto without departing from its context. Notably, the strips playing the role of closing device can be molded in a material similar to that of the tread at the time of molding of the said tread or in another material that can be fitted to the tread during or after its manufacture.

The invention claimed is:

1. A tire having a tread comprising:
    at least two grooves of generally circumferential orientation and having a cross-section,
    a plurality of transverse grooves, at least one plurality of transverse grooves culminating in openings into these two circumferential grooves,
wherein the circumferential and transverse grooves have cross sections adapted to allow, when running, a flow of liquid present on the road surface,
wherein one of these circumferential grooves comprises a plurality of closing devices, and wherein the other of these circumferential grooves is totally devoid of any closing devices,
wherein each closing device at least partly closes the cross section of the circumferential groove,
wherein each closing device is adapted to flex and open the section of the circumferential groove in which it is placed only under the action of a flow of liquid when running on a water-covered road surface,
wherein these closing devices are disposed so as to delimit with each transverse groove a resonator of length LR between one of the closing devices and the opening of said transverse groove opening in the circumferential groove devoid of closing devices,
wherein the noise associated with the resonances of the air columns in said circumferential grooves is reduced, and
wherein each resonator has a length LR of between half and three-quarters of the length of circumferential groove in contact with the ground, the length measured under nominal conditions of load and pressure.

2. The tire according to claim 1, wherein two closing devices are formed between two consecutive openings of transverse grooves in the circumferential groove provided with closing devices.

3. The tire according to claim 1, wherein a single closing device is formed between two consecutive openings of transverse grooves in the circumferential groove provided with closing devices.

4. The tire according to claim 1, wherein each closing device occupies at least 70% of the cross section of the groove in which it is placed.

5. The tire according to claim 1, wherein each closing device is formed by a strip made of flexible material of a thickness adapted to allow by flexing the opening of the section of the groove in which it is placed, wherein the strip is fixed at its base to the bottom of a groove.

6. The tire according to claim 1, wherein each closing device is formed by two strips made of flexible material, wherein each strip is fixed to a wall delimiting a groove.

7. The tire according to claim 5 wherein each strip extends from the bottom of the groove over a height at least equal to 50% of the depth P of the transverse groove.

8. The tire according to claim 7 wherein each strip extends from the bottom of the groove over a height at least equal to 70% of the depth P of the transverse groove.

* * * * *